E. L. GLAZE.
SEED STRIPPER.
APPLICATION FILED SEPT. 17, 1913.
1,133,720.
Patented Mar. 30, 1915.
4 SHEETS—SHEET 2.
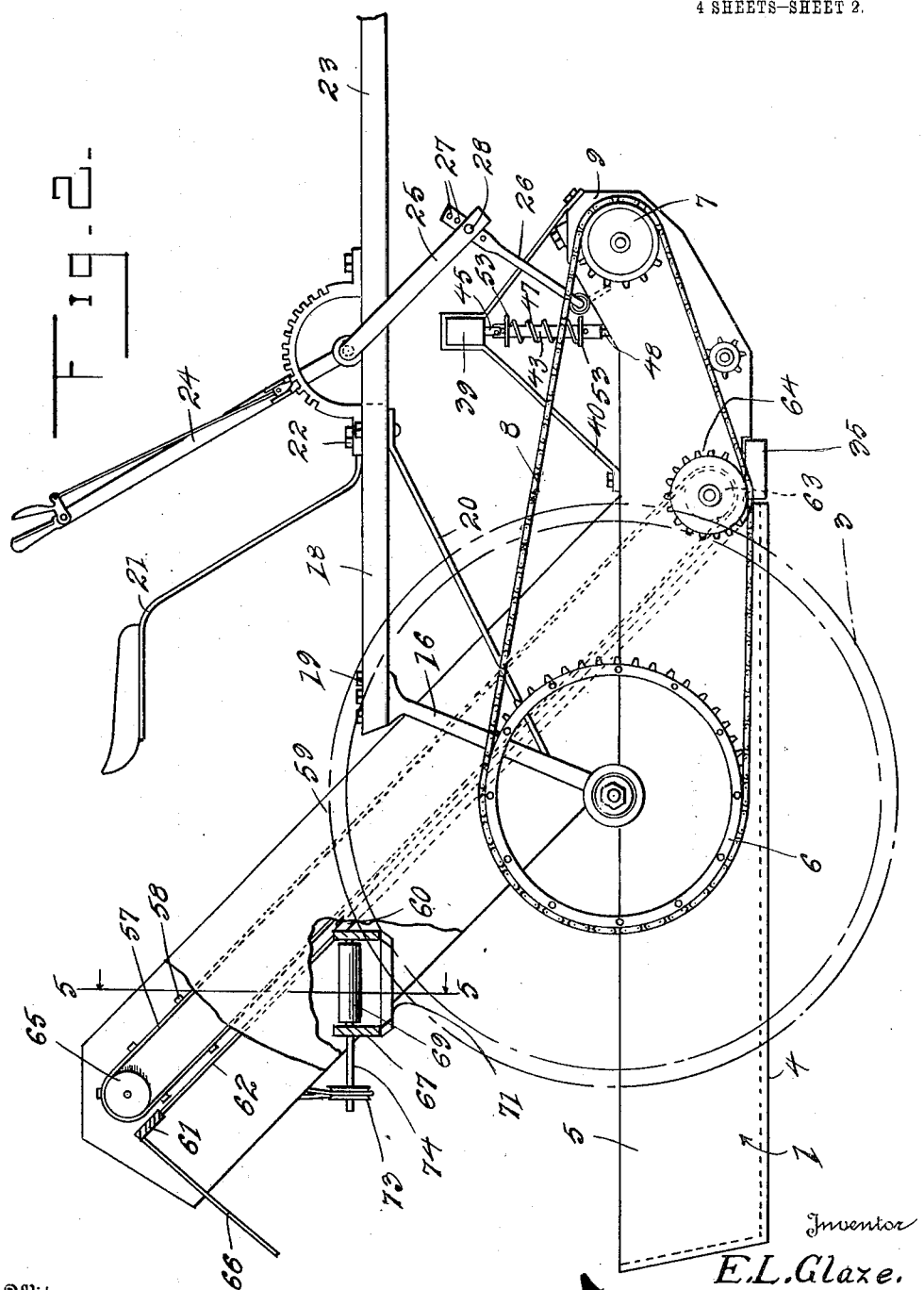
Witnesses
C. R. Ball.
A. E. Johnson.
Inventor
E. L. Glaze.
By Randolph Jr.
Attorney

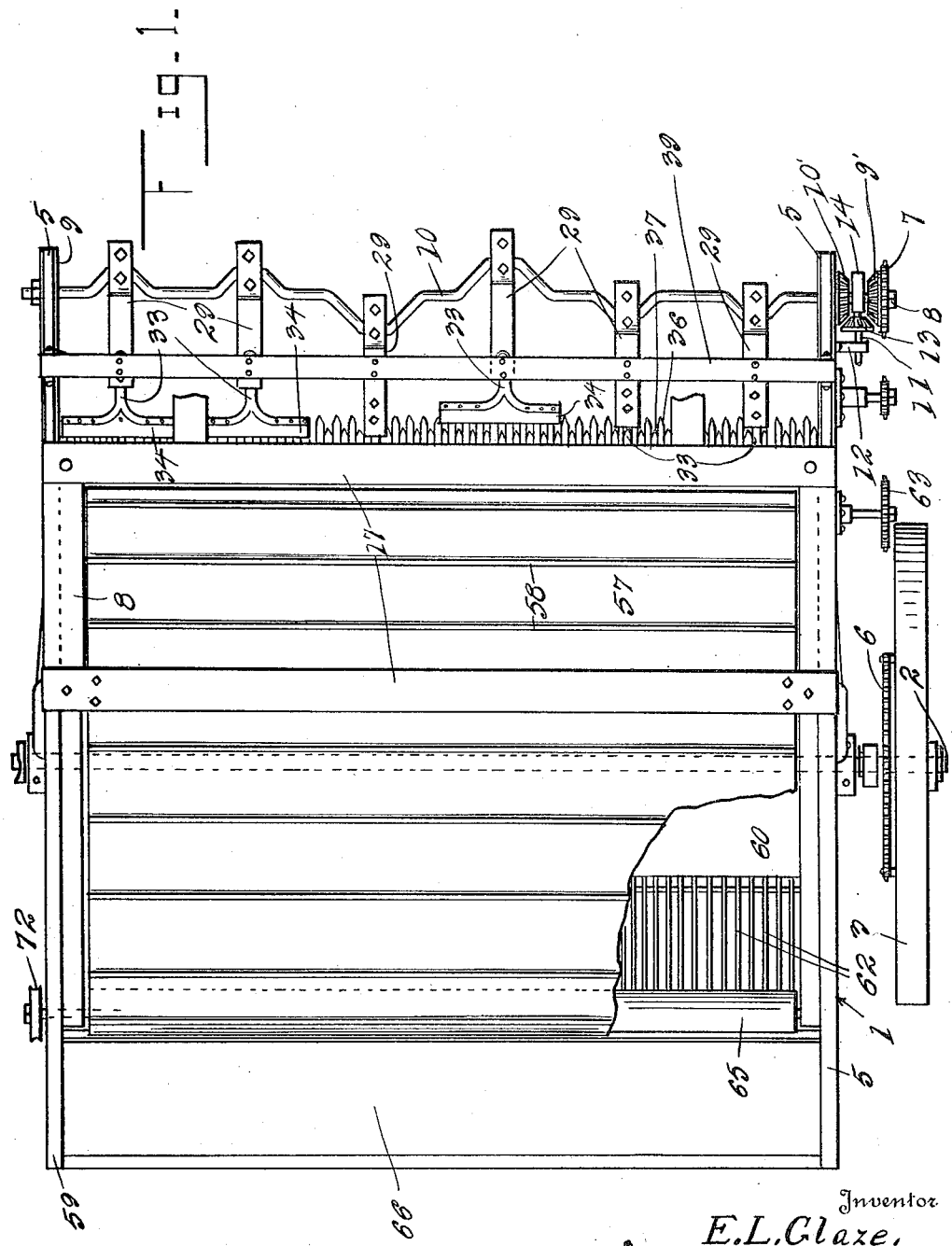

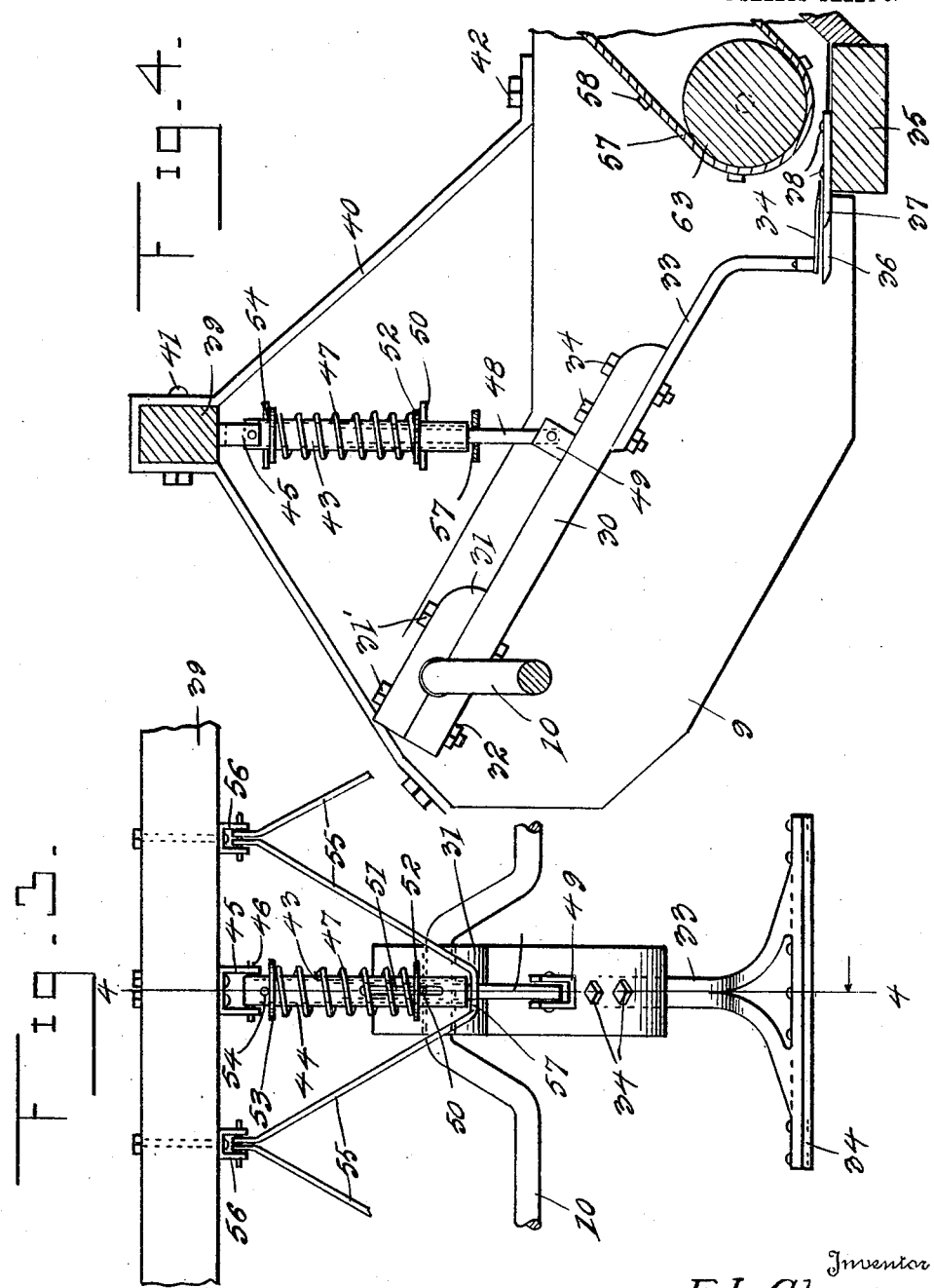

E. L. GLAZE.
SEED STRIPPER.
APPLICATION FILED SEPT. 17, 1913.
1,133,720.
Patented Mar. 30, 1915.
4 SHEETS—SHEET 4.
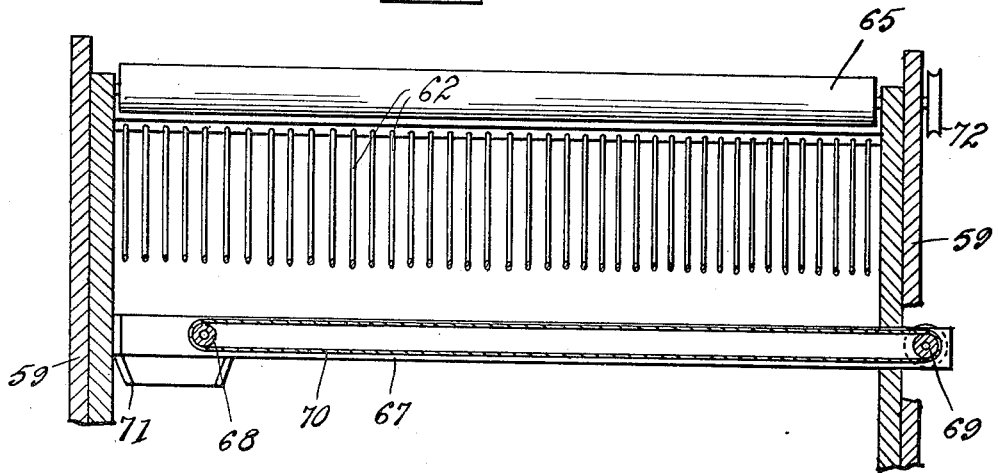
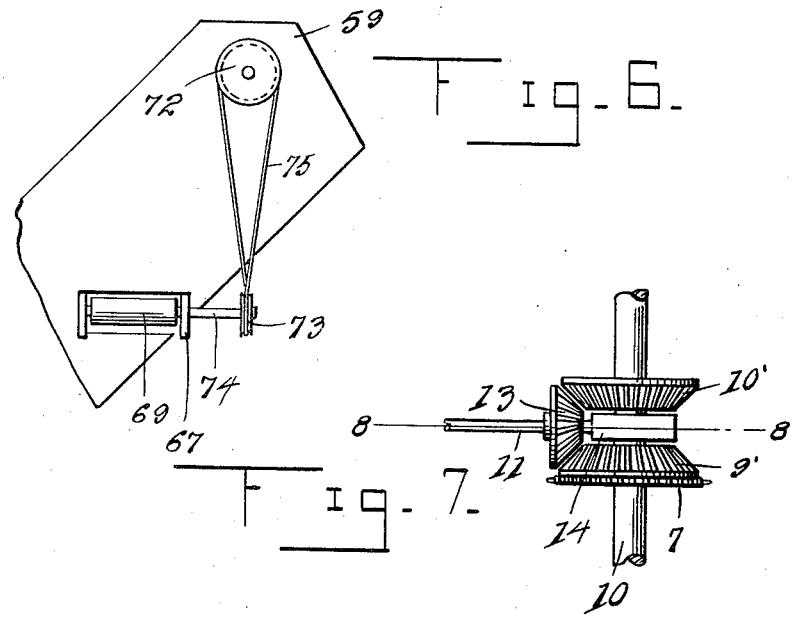
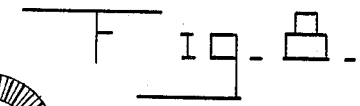
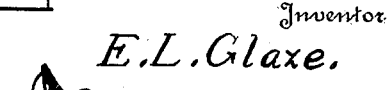
Witnesses
C. R. Bealle.
A. E. Johnson.
Inventor
E. L. Glaze.
By
Attorney

UNITED STATES PATENT OFFICE.

EARL L. GLAZE, OF LEXINGTON, KENTUCKY.

SEED-STRIPPER.

1,133,720.  Specification of Letters Patent.  Patented Mar. 30, 1915.

Application filed September 17, 1913. Serial No. 790,364.

*To all whom it may concern:*

Be it known that I, EARL L. GLAZE, a citizen of the United States, residing at Lexington, in the county of Fayette and State of Kentucky, have invented certain new and useful Improvements in Seed-Strippers; and I do hereby declare the following to be a full, clear, and exact description of the invention, such as will enable others skilled in the art to which it appertains to make and use the same.

My invention relates to new and useful improvements in seed strippers, and has for its object the provision of such a device that will strip the seeds and convey them to a sacking mechanism in a reliable and expeditious manner.

An object of importance is to provide a stripper, such as described, which employs novel means for stripping and conveying the seed, consisting of a plurality of cutters coacting with a comb, and an endless belt conveyer.

A further object of my invention resides in the provision of novel means for cutting the seed and disposing them in a position where they may be readily engaged by an endless conveyer.

Another important object of my invention is to provide a seed stripper, such as described, which employs a plurality of spaced teeth arranged in staggered relation and forming, what is known as a comb for engagement with the grass, or other plants carrying the seed, whereby the cutters may remove the seed from the grass et cetera.

Another object of importance is to provide novel means for receiving the seed from the endless conveyer and depositing them within a spout about which may be secured a sack, whereby the grain is sacked as it is being stripped.

A further important object resides in the provision of means for disposing of weeds which may have become cut and conveyed upon the endless conveyer.

With these and other objects in view as will become more apparent as the description proceeds, the invention consists in certain novel features of construction, combination and arrangement of parts as will be hereinafter fully described and claimed.

For a complete understanding of my invention, reference is to be had to the following description and accompanying drawings, in which—

Figure 1 is a top plan view of my entire device, showing a portion of the endless belt and frame work broken away to illustrate a portion of the sorting bars. Fig. 2 is a side elevation of my device in assembled operative position. Fig. 3 is a detail elevation of one of the cutting members and its coöperating parts, Fig. 4 is a sectional view taken on the plane of line 4—4 of Fig. 3 illustrating the position of the cutting members relative to the comb, and elevating mechanism, in the position assumed when cutting or stripping the seed, Fig. 5 is a transverse sectional view taken on the plane of line 5—5 of Fig. 2 illustrating the sorting bars and sacking mechanism, Fig. 6 is a detail view of the mechanism for operating the sacking mechanism, Fig. 7 is a detail view of the clutch mechanism for operably connecting one of the wheels supporting the stripper, with the cutters, and Fig. 8 is a sectional view taken on the plane of line 8—8 of Fig. 7, illustrating the manner of connecting the sliding beveled gear with the shaft carrying the fixed beveled gears.

Referring in detail to the drawings by numerals, 1 consists of the body of a wheel supported frame, having an axle 2 extending transversely therethrough which carries terminally a pair of wheels 3. The body 1 consists of the usual bottom wall 4 and side walls 5 and may have secured thereto a suitable motor for propelling the stripper.

One of the wheels 3, supporting the frame, is provided with a sprocket wheel 6, which is secured upon the inner side of the wheel by bolts or other suitable fastening means and is operably connected with a sprocket wheel 7 by means of a flexible chain 8. The side walls 5 of the body 1 terminate forwardly in upwardly extending or upwardly inclined portions 9 through which is journaled a crank shaft, designated as an entirety by the numeral 10. The crank shaft 10 extends transversely through the portions 9 and has loosely mounted upon one terminal thereof the sprocket wheel 7 that is held against removal by the nut 8. The terminal of the crank shaft 10, which carries the sprocket wheel 7, extends considerably beyond the adjacent side wall 5 whereby the sprocket wheel 7 is disposed in spaced relation to the side wall 5, as will be clearly seen with reference to Fig. 1. A beveled gear 9' is loosely mounted upon the extended terminal of the crank shaft 10 and is secured in any suitable manner to the adjacent face of the sprocket 7 and adapted to turn therewith. A similar beveled gear 10' is keyed upon the extended terminal of the crank shaft 10 in spaced relation to the gear 9' and adjacent the outer face of the side wall 5. A shaft 11 supported in spaced parallel relation with the side wall 5 by means of a bracket 12 has loosely mounted thereon a beveled gear 13 which is adapted to be moved into meshing engagement with the beveled gears 9' and 10'. The shaft 11 is slidable through the bracket 12 and is provided upon its outer terminal with an enlarged portion 14 that is longitudinally apertured, as at 15, and fitted loosely upon the crank shaft 10. It will thus be seen that by means of the enlarged portion 14, aperture 15, and bracket 12, the shaft 11 and beveled gear 13 is slidably supported and may be moved into and out of engagement with the beveled gears 9' and 10', and further that the gear 13, in meshing with the gears 9' and 10', provides for the transmission of rotation to the crank shaft 10.

A pair of supporting arms 16 is secured to the axle 2, each arm extends upwardly therefrom, and has supporting engagement with a skeleton frame consisting of side bars 17 and end bars 18. The arms 16 are bolted, or otherwise suitably secured to the terminals of the bars 17 and 18, as at 19. Brace rods 20 are secured at their terminals to the arms 16 and to the bars 18. The usual spring seat, designated as an entirety by the numeral 21, is secured in any suitable manner, as at 22, to the forward bar 17 of the upper frame. A pair of shafts 23 are secured in any suitable manner to the forward bar 17. A lever and lever locking mechanism, designated as an entirety by the numeral 24, is secured to one of the end bars 18 and is connected with the body 1 by means of an extension 25 and a link 26 that is provided at its connection with the extension 25 with a plurality of adjusting openings 27, whereby the pin 28 which connects the link and extension 25, may be inserted in different openings 27 to regulate the adjustment of the body 1, and consequently providing for the raising and lowering of the comb to be next described. The lever 24 is conveniently situated with relation to the seat 21 that the operator may raise or lower the comb as desired so that the stripping mechanism may be operated in connection with long or short grass.

A plurality of cutters, designated 29 as an entirety, are rotatably mounted upon the crank shaft 10 in such a manner as to cause them to be moved independently with relation to each other. The cutters 29 are identical in construction and each comprises a body portion 30 which consists of a rectangular bar which is secured at one terminal to the crank shaft 10 by means of a clamping block 31 and bolts 31' which extend through the clamping block, and are held against removal by means of nuts 32. An angular supporting arm 33 is bolted or otherwise suitably secured, as at 34, to the free terminal of the body portion 30 and carries at its free terminal a cutting blade 34 that is secured to the supporting arm 33 in any suitable manner and extends at right angles thereto.

A beam 35 is mounted transversely of the body 1 at the forward terminal of the bottom wall 4 thereof. A comb consisting of a plurality of alternate long and short pointed teeth 36 and 37 respectively, is bolted, as at 38, to the upper side of the beam 35, so that the teeth 36 and 37 thereof, extend outwardly from the beam 35. The teeth 36 extend beyond the terminals of the teeth 37 and are spaced by the teeth 37, thus providing a comb which is adapted for engagement with the grass or other plant, carrying the seed and will, when the stripper is drawn across the field, engage the seed of the grass et cetera, and partially strip the seed from the plant, owing to their peculiar construction and arrangement, which may be clearly seen with reference to Fig. 1.

A beam 39 is mounted transversely of the side walls 5 in superposed spaced relation thereto by means of supporting rods 40 that are secured to the beam 39 and to the side walls 5 of the body 1 at each terminal of the beam 39. A bolt 41 extends through the supporting rods 40 and the beam 39, and bolts 42 secure the lower terminals of the supporting rods 40 whereby the beam 39 is rigidly secured and supported upon the body 1.

Cutter pressing members, designated as an entirety by the numeral 43 are pivotally secured to the beam 39 and to each of the body portions 30 of the cutters, and as each of the cutter pressing members 43 is identical as to construction, it is thought necessary to describe only one of them. This cutter pressing member consists of a cylindrical sleeve 44 that is pivotally secured to the beam 39 by means of a U-shaped bracket 45 that is bolted or otherwise secured to the underside of the beam 39 and has extending therethrough a pin 46 which extends through the upper terminal of the cylindrical sleeve 44 and serves as a pivot for the sleeve 44. A helical spring 47 is mounted about the cylindrical sleeve 44. A rod 48 is pivotally secured at one terminal to a U-shaped bracket 49 that is bolted or otherwise suitably secured to the upper face of the body portions 30 of the cutter at a point near the forward terminal thereof. The other terminal of the rod 48 extends upwardly into the sleeve 44 and is provided at its upper terminal with a pin 50 extending transversely through the rod 48 and longitudinal slots 51 formed diametrically opposite in the sleeve 44. An annular washer 52 is loosely mounted upon the sleeve 44 above the pin 50 and engages the lower terminal of the helical spring 47. The upper terminal of the spring 47 engages an annular washer 53 that is loosely mounted upon the sleeve 44 and held against upward movement thereon by means of a pin 54 extending transversely through the upper terminal of the sleeve 44 beneath the pin 46 and engaging the washer 53. A plurality of V-shaped supports 55 are pivoted at their upper free terminals to U-shaped brackets 56 that are bolted to the beam 39. The rod 48 extends through the lower portion 57 of the V-shaped supports 55 which engages the lower terminals of the sleeve 44 and prevents any lateral movement of the cutter lifting members 43.

It will thus be seen that when the crank shaft 10 is rotated, the cutters 29 will be moved toward the teeth 36 and 37 so that the blades 34 thereon will engage the upper face of the teeth 36 and 37 of the comb and slide inwardly thereon. When the teeth 36 and 37 of the comb engage the heads of the grass carrying the seed, the seed will be disposed above the teeth and upon the movement of the blade 34, as described, the seed will be removed from the grass. The cutters 29 move toward the comb with the action of the crank shaft 10 with the action of the helical spring 47 of the cutter pressing members 43. The cutters 29 are pressed downwardly against the comb by the action of the springs 47, thus disposing the seeds which are engaged by the blades 34 in such a position that the seeds will be readily engaged by the elevator or endless conveyer, designated 57 as an entirety, and which will be hereinafter described. The elevator or endless conveyer consists of a belt of canvas, or other suitable material, provided with a plurality of spaced scraping members 58 that are carried transversely on the belt.

The elevator supporting frame consists of a pair of side walls 59 and a bottom wall 60. The bottom wall 60 is arranged intermediate the edges of the side walls 59. A bar 61 is mounted transversely of and connected with the side walls 59 at the upper terminals thereof. A plurality of spaced sorting bars 62 are mounted longitudinally with respect to the side walls 59 in the space afforded between the bar 61 and upper terminal of the bottom wall 60. The elevator frame consisting of the side walls 59 and bottom wall 60, as described, is suitably secured in an upwardly and rearwardly inclined position relative to the body 1. A roller 63 is journaled in the body 1 transversely and at the forward terminal thereof. A sprocket wheel 64 is keyed to one of the terminals of the roller 63 and engages the flexible chain 8, whereby the roller 63 is rotated when the stripper is pulled or propelled. A roller 65 is journaled within and transversely of the side walls 59 of the elevator frame. The belt 57 of the elevator is mounted upon the rollers 63 and 65, and when the lower roller 63 is rotated, the belt is imparted a similar movement, and by means of the transverse scraping members 58, carries the seed upwardly upon the bottom wall 60 of the elevator frame until the seed reach the sorting bars 62, whereupon they will fall therethrough and upon a sacking mechanism, to be next described. Any weeds, which may have been conveyed upwardly, pass over the bars 62 and slide rearwardly of the stripper upon a weed deflecting plate 66 that is inclined so as to dispose of the weeds rearwardly of the stripper and secured at its upper terminal to the bar 61. This sacking mechanism consists of a trough 67 that is secured in any suitable manner to the upper edge of the bottom wall 60 beneath the sorting bars 62 and extends transversely of the side walls 59. A pair of rollers 68 and 69 are journaled adjacent each terminal of the trough 67 and have mounted thereon an endless belt 70. One terminal of the trough 67 is provided with a downwardly extending spout, designated as an entirety by the numeral 71. A sack may be suitably secured to the spout 71, and as the roller 68 is journaled thereover, the seed which drop through the sorting bars 62 and upon the belt 70, will be deposited into the spout and thence the sack.

As a means for causing the belt 70 to be rotated and deposit the seed within the spout 71, this invention employs a grooved pulley 72 that is connected with the roller 65 at one terminal thereof and is operably connected with a pulley 73 that is secured to a stud shaft 74 carried by the roller 69 by means of a belt 75. It will thus be seen that when the elevator belt 57 is operated, that the belt 70 in the trough 67 is rotated through the medium of the pulleys 72 and 73, and the desired action is had.

To operate the device the shaft 11 is moved so that the gear 13 thereon meshes with the gears 9' and 10'. In this connection it will be noted that any suitable means may be employed for sliding the shaft 11 and it has not been thought necessary to illustrate and describe such means. The gear 9' is connected with one of the road wheels 3 and is loosely mounted upon the crank shaft 10 and rotated when the device is being drawn across a field, thus the gear 10' which is keyed upon the shaft 10 is rotated when the connecting medium consisting of the gear 13 meshes with the gears 9' and 10'. The shaft 10 then revolves and the cutters move into engagement with the teeth 36 and 37 of the comb. The comb serves to partially remove the seeds from the plant and the cutters 29 complete the operation of removing the seeds and dispose the seeds in such a position that they will be readily engaged by the transverse strips 58 of the elevator belt 57 and carried upwardly to be deposited in the trough at the rear of the machine. It will be readily seen that the stripping mechanism may be raised or lowered with relation to the ground through the medium of the lever 24 and coöperating parts. The seed are then carried to the sorting bars 62 and dropped therethrough upon the belt 70, from thence they will be conveyed to the spout 71 and to a sack, not shown, that may be placed about the opening of the spout.

It is apparent, with reference to the foregoing description and several views, that a stripper is provided which will accomplish all of the functions hereinbefore recited.

While I have shown and described the preferred embodiment of my invention, it will be understood that minor changes in construction, combination and arrangement of parts may be made without departing from the scope and spirit of the invention as claimed.

Having thus described my invention, I claim:—

1. In a seed stripper the combination with a frame, a crank shaft journaled within and transversely of the forward terminal of said frame, a comb disposed transversely of said frame, a beam disposed above and transversely of said frame at the forward terminal thereof, cutters operatively connected with the crank shaft and said beam, means for rotating said crank shaft to cause said cutters to move into engagement with said comb, means for causing said cutters to move into engagement with said comb, comprising a plurality of tubular members pivoted to said beam, rods connected to said cutters and slidably mounted within said tubular members; and springs mounted upon said tubular members.

2. In a seed stripper, a frame, a crank shaft rotatably journaled within said frame, a comb disposed transversely of said frame, a plurality of cutters operatively connected with said crank shaft, means for rotating said crank shaft to cause said cutters to move into engagement with said comb, means for causing said cutters to move into engagement with said comb comprising a plurality of tubular members operatively connected with said frame, rods slidable in said tubular members and connected with said cutters and spring means mounted upon said tubular members for lifting said cutters upwardly.

3. In a seed stripper, a frame, a crank shaft rotatably journaled within said frame, a comb disposed transversely of said frame, a plurality of cutters operatively connected with said crank shaft, means for rotating said crank shaft to cause said cutters to move into engagement with said comb, means for causing said cutters to move into engagement with said comb comprising a plurality of tubular members operatively connected with said frame, rods slidable in said tubular members and connected with said cutters and spring means mounted upon said tubular members for lifting said cutters upwardly, means for pivotally supporting said means for causing the cutters to move into engagement with said comb.

4. A seed stripper comprising a frame, a crank shaft rotatably journaled in said frame, a plurality of cutters pivotally connected with said crank shaft, a plurality of spaced teeth secured upon said frame and arranged to coöperate with said cutters, a beam disposed above said cutters, a plurality of tubular members pivotally connected with said beam, a plurality of rods pivotally connected with said cutters and slidably mounted in said tubular members, guide means for each of said rods and an expansive spring mounted upon each of said tubular members and operatively connected with said rods.

In testimony whereof I affix my signature in presence of two witnesses.

EARL L. GLAZE.

Witnesses:
R. S. CRAWFORD,
D. KRASNE.

Copies of this patent may be obtained for five cents each, by addressing the "Commissioner of Patents, Washington, D. C."